United States Patent [19]
Niki et al.

[11] Patent Number: 6,092,487
[45] Date of Patent: Jul. 25, 2000

[54] AIR SUPPLY/EXHAUST DEVICE FOR EXPERIMENTAL ANIMAL REARING APPARATUS

[76] Inventors: Motohiro Niki, Bunkyo-ku; Atsushi Kidachi, Sakura; Mieko Niki; Etuko Niki, both of Bunkyo-ku; Misako Kidachi, Sakura, all of Japan

[21] Appl. No.: 09/173,792

[22] Filed: Oct. 16, 1998

[51] Int. Cl.[7] .................................................. A01K 1/00
[52] U.S. Cl. ........................... 119/420; 119/493; 119/500
[58] Field of Search ................................... 119/420, 452, 119/493, 500, 453

[56] References Cited

U.S. PATENT DOCUMENTS

| 5,165,362 | 11/1992 | Sheaffer et al. | 119/452 |
| 5,865,144 | 2/1999 | Semenuk | 119/456 |

FOREIGN PATENT DOCUMENTS

| 1056898 | 3/1998 | Japan . |
| 10178950 | 7/1998 | Japan . |

Primary Examiner—Peter M. Poon
Assistant Examiner—Yvonne R. Abbott
Attorney, Agent, or Firm—Ladas & Parry

[57] ABSTRACT

An air supply/exhaust device to be joined to a box-shaped rearing cage included in an experimental animal rearing apparatus to supply or exhaust air into or from the rearing cage. The air supply/exhaust device comprises an air supply pipe having a front end section provided with air supply/exhaust holes, and a stop ring mounted on a section of the air supply pipe behind the front end section provided with the air supply/exhaust holes. An elastic plug is mounted on a section of the air supply pipe extending behind the stop ring so as to be in contact with a back surface of the stop ring. The elastic plug has the shape of a truncated cone tapered toward an extremity of the air supply/exhaust pipe, and a spring holder is provided on the air supply pipe, and an elastic pressing member is mounted on a section of the air supply pipe between the elastic plug and the spring holder to press the elastic plug continuously toward the stop ring. When the air supply/exhaust device is connected to a box-shaped rearing cage, the elastic plug is inserted through an opening formed in the rear end wall of an upper cage included in a box-shaped rearing box into the upper cage and engages firmly with the edge of the opening to seal the box-shaped rearing cage.

6 Claims, 4 Drawing Sheets

AIR SUPPLY/EXHAUST DEVICE FOR EXPERIMENTAL ANIMAL REARING APPARATUS

BACKGROUND OF THE INVENTION

1. Field of the Invention

The present invention relates to an air supply/exhaust device for an experimental animal rearing apparatus for rearing experimental animals, such as mice or rats and, more particularly, to an air supply/exhaust device capable of supplying fresh air into a box-shaped rearing cage or of exhausting air from the box-shaped rearing cage.

2. Description of the Related Art

Referring to FIGS. 5 to 7, a conventional experimental animal rearing apparatus (hereinafter referred to simply as rearing apparatus) comprises a rearing rack 2, a box-shaped rearing cages 3, air supply devices 4, automatic water supply devices 5 and, if necessary, air exhaust devices. As shown in FIG. 5, the rearing rack 2 is a vertical frame formed in the shape of a rectangular parallelepiped by assembling angle irons or the like, and having a back frame 6, a top frame and a bottom frame. The bottom frame is supported on four casters 7. Formed between the top and the bottom frame are, for example, three rearing cage storing spaces 8. Each rearing cage storing space 8 is capable of storing, for example, three box-shaped rearing cages 3 in a transverse arrangement.

As shown in FIG. 6, each box-shaped rearing cage 3 is made, for example, of a transparent plastic material and is provided with a flange 9 around an open upper end thereof. The open upper end of the box-shaped rearing cage 3 is covered with a lid 10. A rear end wall of the box-shaped rearing cage 3, i.e., an end wall to be in the back of the case storing space 8 when the box-shaped rearing cage 3 is stored in the case storing space 8, is provided with an opening 11 for receiving the air supply device 4, an opening 12 for receiving the automatic water supply device 5 and, if necessary, an opening, not shown, for receiving an air exhaust device.

As shown in FIGS. 6 and 7, the air supply device 4 has an air supply pipe 13 and a sealing cup 14. The air supply pipe 13 is provided in its upper part with, for example, four air supply holes 15 to blow air upward. The extremity of the air supply pipe 13 is closed with a pipe plug 16. The sealing cup 14 is fitted on the air supply pipe 13 so as to be set in contact with the outer surface of the rear end wall of the box-shaped rearing cage 3 when the rearing cage 3 is put in place in the case storing space 8. The air supply pipe 13 is attached to the back frame 6 so as to project into the case storing space 8 and is connected to an air blower, not shown. As shown in FIG. 7, the sealing cup 14 is formed in the shape of a cup having a diameter greater than that of the opening 11 of the box-shaped rearing cage 3 and provided with a flange 17 at its open end. The sealing cup 14 is fitted on the air supply pipe 13 so as to open toward the extremity of the air supply pipe 13.

Referring to FIG. 6, the automatic water supply device 5 has an outer pipe 18, a water supply pipe 19, and a sealing cup 20 similar to the sealing cup 14 of the air supply device 4. The outer pipe 18 is attached to the back frame 6 so as to project into the case storing space 8 and is connected to a main water supply pipe 21. The sealing cup 20 is fitted on the outer pipe 18 so as to open toward the extremity of the outer pipe 18. If necessary, an air exhaust pipe of the same construction as the air supply pipe 13 may be held on the back frame 6.

When the box-shaped rearing cage 3 is pushed into the case storing space 8, the air supply pipe 13 of the air supply device 4 and the outer pipe 18 of the automatic water supply device 5 are inserted through the openings 11 and 12, respectively, into the box-shaped rearing cage 3, and the respective flanges 17 and 22 of the sealing cups 14 and 20 are brought into close contact with the outer surface of the rear end wall of the box-shaped rearing cage 3. Consequently, the box-shaped rearing cage 3 is sealed and the air supply device 4 and the automatic water supply device 5 are joined firmly to the rear end wall of the rearing cage 3. Thus, fresh air and fresh water can always be supplied to animals, such as mice or rats, kept in the rearing cage 3. An air exhaust device can be joined to the rearing cage 3 in the same manner.

The sealing cup 14 of the air supply device 4 needs the flange 17 of a predetermined diameter to set the sealing cup 14 in close contact with the surface of the rear end wall of the rearing cage 3. The sealing cup 14 cannot be set in close contact with the outer surface of the rear end wall of the box-shaped rearing cage 3 unless the end surface of the flange 17 and the outer surface of the rear end wall of the rearing cage 3 are clean, smooth and flat. The same condition applies to the automatic water supply device 5. The sealing cups 14 and 20 have a large diameter and take a large space. The sealing cup 14 is unable to seal the interior of the rearing cage 3 properly and a gap may be formed between the end surface of the flange 17 and the outer surface of the rear end wall of the rearing cage 3 unless the sealing cup 14 is held on the air supply pipe 13 so that a plane including the end surface of the flange 17 is substantially perpendicular to the axis of the air supply pipe 13. The same condition applies to the sealing cup 20 of the automatic water supply device 5. Making the sealing cups 14 and 20 by molding rubber needs a mold having a spherical surface, which is not easy to make and increases the cost of the air supply device 4 and the automatic water supply device 5.

SUMMARY OF THE INVENTION

It is an object of the present invention to provide an air supply/exhaust device for an experimental animal rearing apparatus, having a simple construction, employing a plug of a relatively small outside diameter, and capable of easily and surely sealing a box-shaped rearing cage.

According to the present invention, an air supply/exhaust device comprises: an air supply pipe having a front end section provided with air supply/exhaust holes; stop means provided on a section of the air supply pipe behind the front end section provided with the air supply/exhaust holes; an elastic plug mounted on a section of the air supply pipe extending behind the stop ring so as to be in contact with a back surface of the stop ring, and having the shape of a truncated cone tapered toward an extremity of the air supply/exhaust pipe; a spring holder provided on the air supply pipe; and an elastic pressing member mounted on a section of the air supply pipe between the elastic plug and the spring holder to press the elastic plug continuously toward the stop ring.

Preferably, the air supply pipe is inserted in a box-shaped rearing cage having an upper cage, a lower cage and a partition member capable of passing air and interposed between the upper and the lower cage through an opening formed in a rear end wall of the upper cage.

DESCRIPTION OF THE PREFERRED EMBODIMENT

Figure 1:
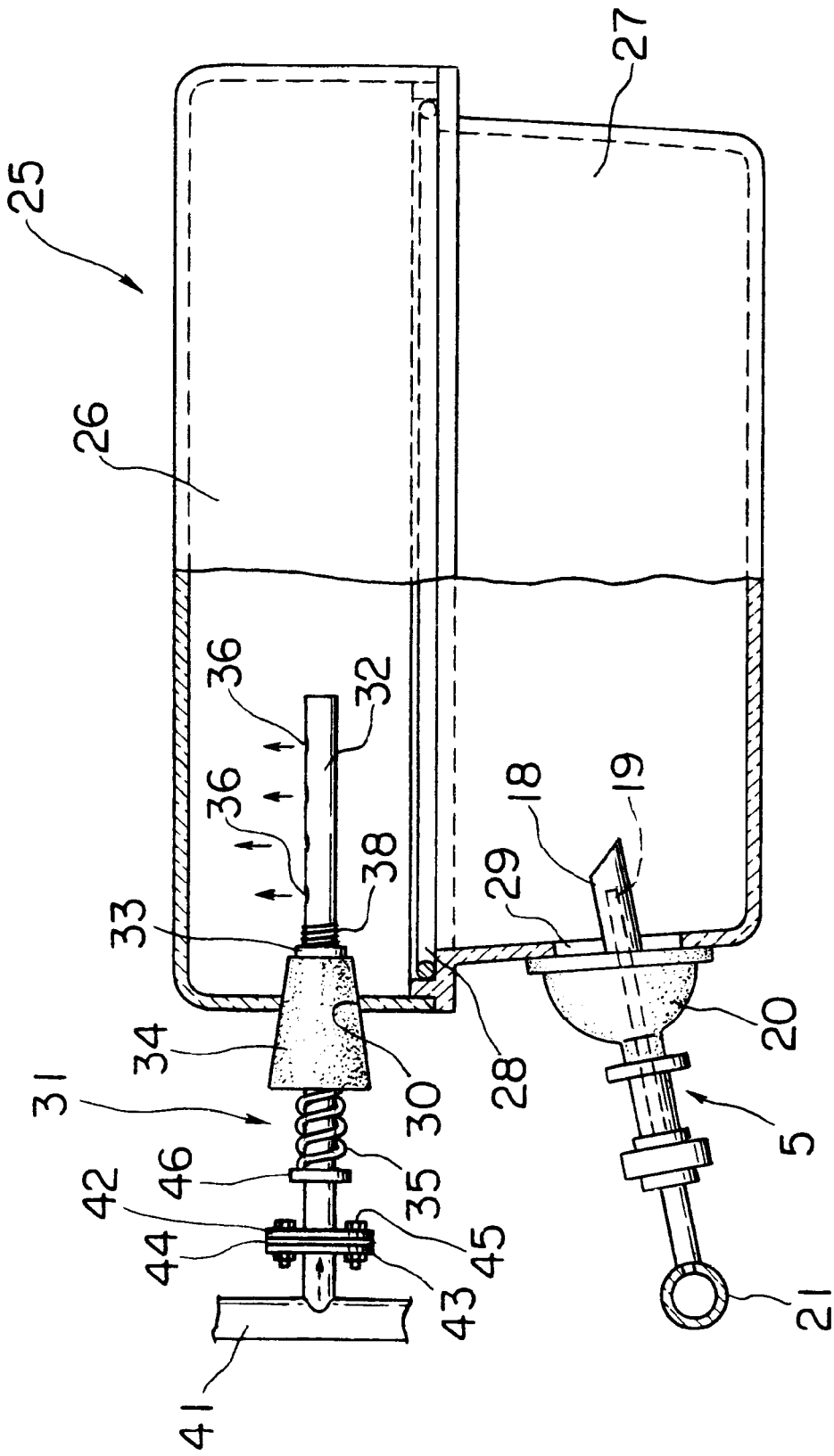
FIG. 1 is a partly sectional side view of a box-shaped rearing cage provided with an air supply/exhaust device in a preferred embodiment according to the present invention, and an automatic water supply device.

Referring to FIGS. 1 to 4, an air supply/exhaust device 31 in a preferred embodiment according to the present invention is intended for use in combination with an experimental animal rearing apparatus for rearing experimental animals, such as mice or rats. A box-shaped rearing cage 25 includes an upper cage 26 made of a transparent plastic material and a lower cage 27 made of a transparent plastic material. A grating 28, i.e., a partition member, formed by processing metal wires and capable of passing air is placed in a step formed in the upper end of the lower cage 27. A rear end wall, i.e., an end wall of a rear part to be placed in the back of the rearing cage storing space 8 (FIG. 5), of the lower cage 27 is provided with an opening 29 for receiving an automatic water supply device 5. A feed box may be formed integrally with the grating 28 so as to be suspended from the grating 28. The upper cage 26 has an open lower end. The upper end of the lower cage 27 is nested in the lower end of the upper cage 26. The rear end wall of the upper cage 26 to be inserted in the rearing cage storing space 8 is provided with an opening 30 for receiving the air supply/exhaust device 31.

Figure 2:
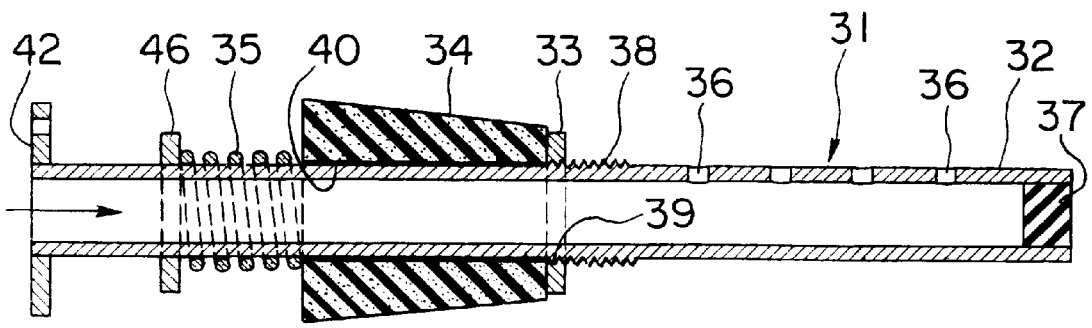
FIG. 2 is an enlarged longitudinal sectional view of the air supply/exhaust device shown in FIG. 1.
Figure 3:
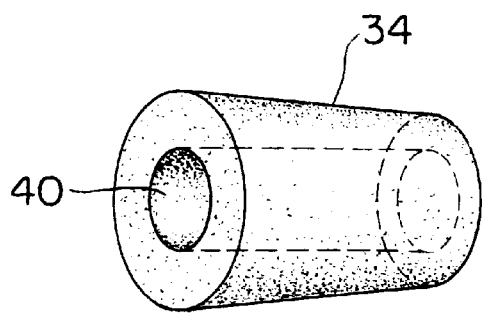
FIG. 3 is a perspective view of an elastic plug included in the air supply/exhaust device shown in FIG. 1.
Figure 4:
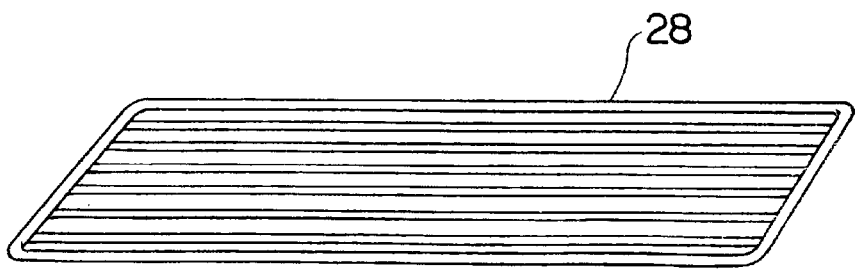
FIG. 4 is a perspective view of a grating serving as a partition member and included in the box-shaped rearing cage shown in FIG. 1.

As most clearly shown in FIG. 2, the air supply/exhaust device 31 comprises a straight, elongate air supply pipe 32, a stop ring 33 provided with an internal screw thread 39, an elastic plug 34, a compression coil spring 35 and a spring holder 46. The air supply pipe 32 is provided in its upper part with, for example, four air supply holes 36 to blow air upward. The open extremity of the air supply pipe 32 is closed with a pipe plug 37. The stop ring 33 is screwed on a threaded section provided with an external screw thread 38 of the air supply pipe 32. The air supply holes 36 need not necessarily open upward. The elastic plug 34 having the shape of a truncated cone as shown in FIG. 3 is mounted on a section of the air supply pipe 32 extending behind the stop ring 33 so as to be in contact with the back surface of the stop ring 33 and to taper toward the extremity of the air supply pipe 32. The elastic plug 34 is made of an elastic material, such as rubber or a plastic material. The elastic plug 34 has an axial bore 40 through which the air supply pipe 32 is extended. The air supply pipe 32 is provided with a flange 42 at its back end. The flange 42 is joined to a flange 43 formed on a main air supply pipe 41 with a packing 44 sandwiched between the flanges 42 and 43 with bolts 45 and nuts screwed on the bolts 45. The coil spring 35 is compressed between the elastic plug 34 and the spring holder 46 fixed to the air supply pipe 46 so that the elastic plug 34 is continuously pressed toward the stop ring 33. The position of the spring holder 46 on the air supply pipe 32 may be axially adjustable.

Figure 5:
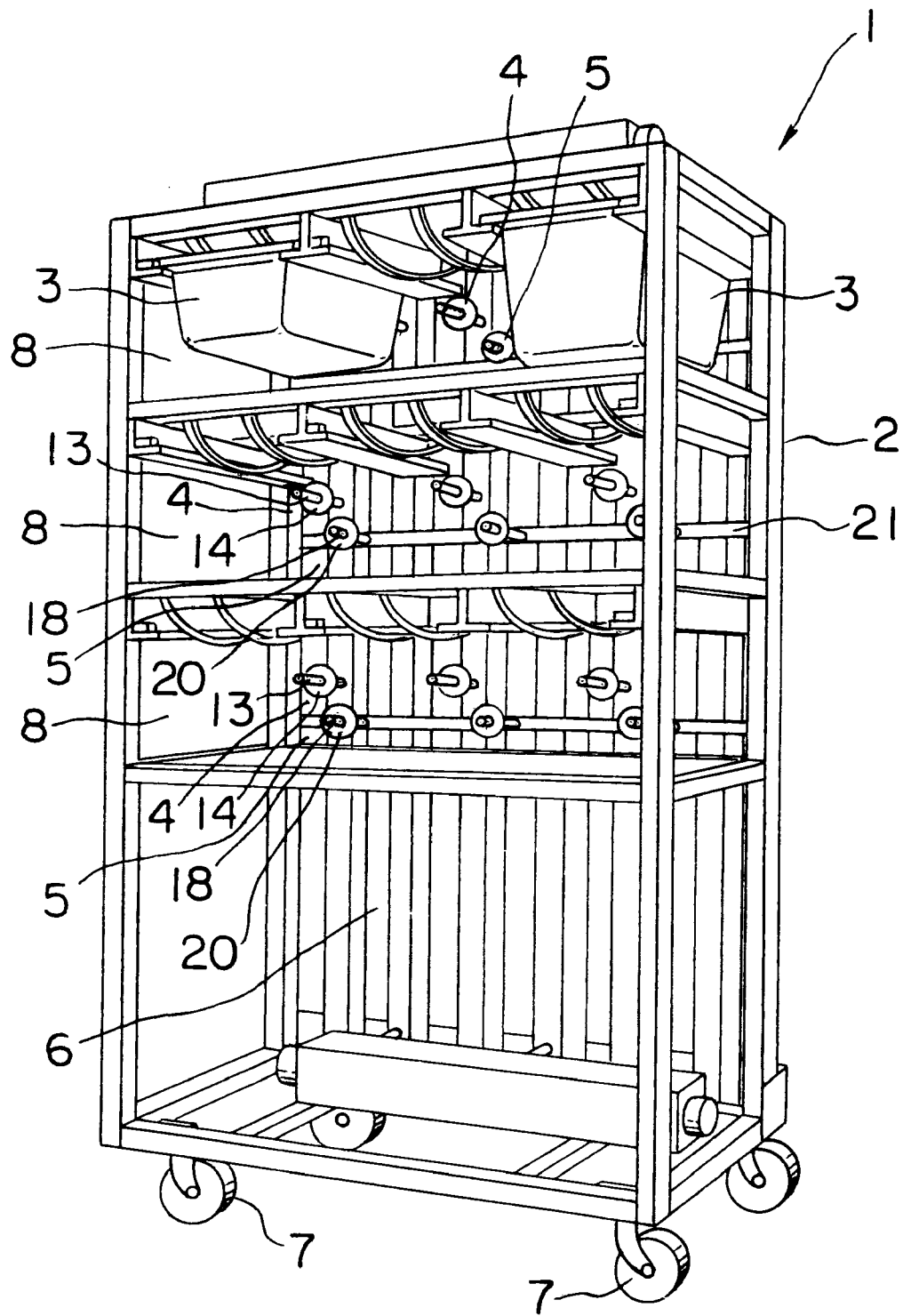
FIG. 5 is a perspective view of an experimental animal rearing apparatus.
Figure 6:
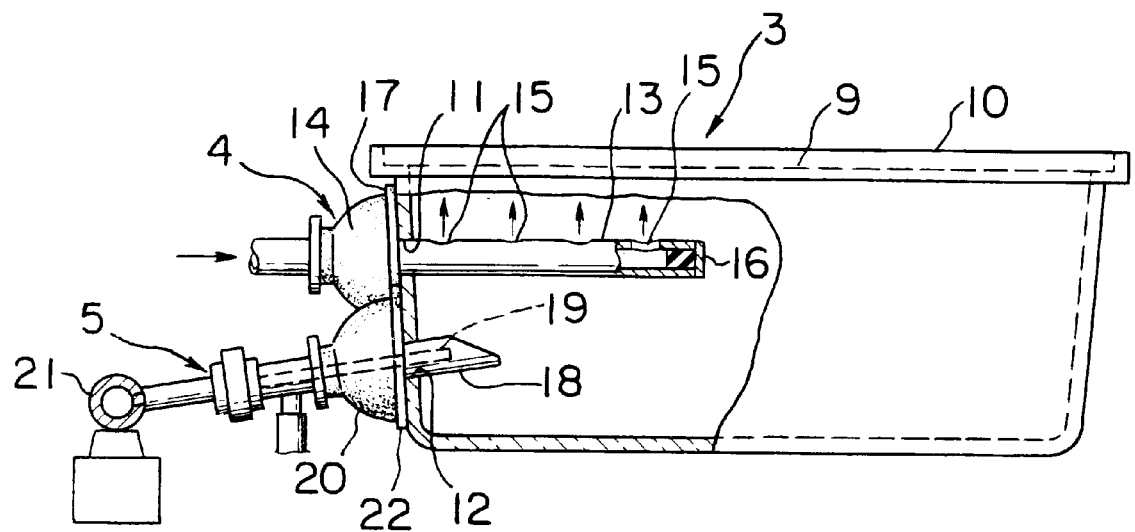
FIG. 6 is a partly sectional side view of a box-shaped rearing cage provided with a conventional air supply/exhaust device.
Figure 7:
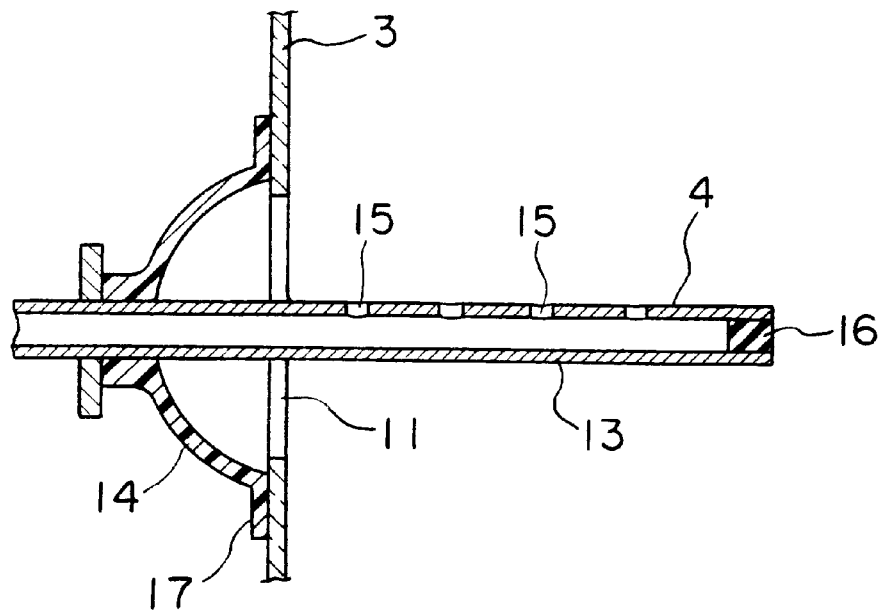
FIG. 7 is a longitudinal sectional view of the air supply device shown in FIG. 6.

When the box-shaped rearing cage 25 is inserted in a rearing cage storing space 8 of a rearing rack 2 similar to that shown in FIG. 5, the air supply pipe 32 is inserted through the opening 30 into the upper cage 26, and then the elastic plug 34 is fitted into the opening 30. Since the elastic plug 34 is continuously pressed toward the stop ring 33 by the resilience of the coil spring 35, a peripheral part of a diameter corresponding to that of the opening 30 of the elastic plug 34 is engaged closely with the edge of the opening 30 of the upper cage 26. When the box-shaped rearing cage 25 is pulled out of the rearing cage storing space 8, the axial movement of the elastic plug 34 on the air supply pipe 32 together with the box-shaped rearing cage 25 is limited by the stop ring 33. Therefore it does not occur that the elastic plug 34 is unseparably caught in the opening 30 or the elastic plug 34 is removed from the air supply pipe 32. The elastic plug 34 may be coated with grease to ensure further reliable sealing of the box-shaped rearing cage 25 and to enable the elastic plug 34 to be easily separated from the box-shaped rearing cage 25 when the box-shaped rearing cage 25 is pulled out of the rearing cage storing space 8.

Experimental animals, such as mice or rats, in the lower cage 27 are unable to move from the lower cage 27 to the upper cage 26 because the upper cage 26 and the lower cage 27 are separated by the grating 28. Accordingly, the grating 28 prevents the experimental animals in the lower cage 27 from gnawing the elastic plug 34 of the air supply/exhaust device 31 connected to the upper case 26.

Although the present invention has been described as applied to the air supply/exhaust device 31 only for supplying air through the air supply holes 36 into the box-shaped rearing cage 25, the term, Óair supply/exhaust deviceÓ used herein shall signify an air supply device capable of only supplying air, an air exhaust device capable of only exhausting air or an air supply/exhaust device capable of both supplying and exhausting air.

As is apparent from the foregoing description, the elastic plug having the shape of a truncated cone can surely and easily be fitted in the opening of the upper cage for the reliable sealing of the box-shaped rearing cage. Since the outside diameter of the elastic plug is relatively small, a plurality of air supply/exhaust devices similar to the air supply/exhaust device described herein can be connected to a relatively small box-shaped rearing cage. The air supply/exhaust device provided with the elastic plug having a simple shape is inexpensive.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. An air supply/exhaust device joined to a box-shaped rearing cage included in an experimental animal rearing apparatus to supply/exhaust air into/from the box-shaped rearing cage, said air supply/exhaust device comprising:

an air supply pipe having a front end section provided with air supply/exhaust holes;

stop means provided on a section of the air supply pipe behind the front end section provided with the air supply/exhaust holes;

an elastic plug mounted on a section of the air supply pipe extending behind a stop ring so as to be in contact with a back surface of the stop ring, and having the shape of a truncated cone tapered toward an extremity of the air supply/exhaust pipe;

a spring holder provided on the air supply pipe; and an elastic pressing member mounted on a section of the air supply pipe between the elastic plug and the spring holder to press the elastic plug continuously toward the stop ring.

2. The air supply/exhaust device according to claim 1, wherein the box-shaped rearing cage has an upper cage having a rear end wall provided with an opening, a lower cage and a partition member capable of passing air and interposed between the upper and the lower cage, and the air supply pipe is inserted through the opening formed in the rear end wall of the upper cage so that the elastic plug is pressed firmly to the edge of the opening of the rear end wall of the upper cage so as to seal the box-shaped rearing cage.

3. The air supply/exhaust device according to claim 1, wherein said air supply/exhaust holes are provided in an upper portion of the said front end section.

4. The air supply/exhaust device according to claim 1, wherein said stop ring is adjustably screw-engaged with said air supply pipe.

5. The air supply/exhaust device according to claim 1, wherein said elastic plug has an axial bore through which said air supply pipe extends.

6. The air supply/exhaust device according to claim 1, wherein said elastic pressing member is a coil spring.

* * * * *